(12) United States Patent
Yokota

(10) Patent No.: US 8,708,569 B2
(45) Date of Patent: Apr. 29, 2014

(54) WHEEL ROLLING BEARING DEVICE

(75) Inventor: Tatsuya Yokota, Toyota (JP)

(73) Assignee: JTEKT Corporation, Osaka-Shi (JP)

( * ) Notice: Subject to any disclaimer, the term of this patent is extended or adjusted under 35 U.S.C. 154(b) by 136 days.

(21) Appl. No.: 13/345,931

(22) Filed: Jan. 9, 2012

(65) Prior Publication Data

US 2012/0189236 A1   Jul. 26, 2012

(30) Foreign Application Priority Data

Jan. 20, 2011   (JP) ................. 2011-009477

(51) Int. Cl.
*F16C 13/00* (2006.01)
*F16C 33/58* (2006.01)

(52) U.S. Cl.
USPC ........................ 384/544; 384/513

(58) Field of Classification Search
USPC ................. 384/544, 449, 513, 545
See application file for complete search history.

(56) References Cited

U.S. PATENT DOCUMENTS

| | | | |
|---|---|---|---|
| 7,104,695 B2* | 9/2006 | Shevket | 384/450 |
| 7,547,147 B2* | 6/2009 | Niebling et al. | 384/544 |
| 7,614,796 B2* | 11/2009 | Hattori et al. | 384/544 |
| 7,832,941 B2* | 11/2010 | Komori et al. | 384/544 |
| 7,862,242 B2* | 1/2011 | Ohtsuki | 384/544 |
| 7,874,734 B2* | 1/2011 | Komori et al. | 384/544 |
| 7,901,143 B2* | 3/2011 | Hattori et al. | 384/544 |
| 7,909,515 B2* | 3/2011 | Takimoto et al. | 384/504 |
| 8,007,182 B2* | 8/2011 | Mock et al. | 384/544 |
| 8,092,095 B2* | 1/2012 | Hattori et al. | 384/544 |
| 8,142,081 B2* | 3/2012 | Fujimura et al. | 384/537 |
| 8,221,004 B2* | 7/2012 | Fujimura et al. | 384/544 |
| 8,302,309 B2* | 11/2012 | Hirai et al. | 29/894.321 |
| 2005/0111771 A1* | 5/2005 | Shevket | 384/544 |
| 2006/0269181 A1 | 11/2006 | Hattori et al. | |
| 2007/0104404 A1* | 5/2007 | Niebling et al. | 384/504 |
| 2008/0199121 A1 | 8/2008 | Komori et al. | |
| 2008/0240639 A1* | 10/2008 | Takimoto et al. | 384/512 |
| 2009/0010586 A1* | 1/2009 | Mock et al. | 384/513 |
| 2009/0106980 A1* | 4/2009 | Hirai et al. | 29/898.04 |
| 2009/0129713 A1* | 5/2009 | Hattori | 384/462 |

(Continued)

FOREIGN PATENT DOCUMENTS

| | | |
|---|---|---|
| EP | 1722115 A2 | 11/2006 |
| EP | 1944518 A1 | 7/2008 |
| JP | A-2004-108449 | 4/2004 |

OTHER PUBLICATIONS

Apr. 27, 2012 European Search Report issued in European Patent Application No. 12151247.9.

*Primary Examiner* — Alan B Waits
(74) *Attorney, Agent, or Firm* — Oliff PLC

(57) ABSTRACT

In a wheel rolling bearing device, where a pitch diameter of the inner-row ball set is D1 and a pitch diameter of the outer-row ball set is D2, D1 and D2 are set so as to satisfy the relationship "D1<D2". Where an angle of a raceway circular arc from an intersection point of each inner-row ball with the inner-side outer ring raceway surface at a contact angle to a boundary portion of an inner-side raceway shoulder is θ1 and an angle of a raceway circular arc from an intersection point of each outer-row ball with the outer-side outer ring raceway surface at a contact angle to a boundary portion of an outer-side raceway shoulder is θ2, θ1 and θ2 are set so as to satisfy the relationship "θ1<θ2".

6 Claims, 9 Drawing Sheets

(56) References Cited

U.S. PATENT DOCUMENTS

| | | |
|---|---|---|
| 2009/0148091 A1 | 6/2009 | Kametaka et al. |
| 2009/0232435 A1 | 9/2009 | Ohtsuki |
| 2009/0252447 A1 | 10/2009 | Hirai et al. |
| 2010/0014795 A1 | 1/2010 | Hattori et al. |
| 2010/0014796 A1 | 1/2010 | Hattori et al. |
| 2010/0142875 A1* | 6/2010 | Mori .............................. 384/572 |
| 2011/0222807 A1* | 9/2011 | Tanoue et al. ................. 384/517 |
| 2012/0189236 A1* | 7/2012 | Yokota .......................... 384/589 |
| 2013/0077909 A1* | 3/2013 | Komori ......................... 384/513 |

* cited by examiner

US 8,708,569 B2

WHEEL ROLLING BEARING DEVICE

INCORPORATION BY REFERENCE

The disclosure of Japanese Patent Application No. 2011-009477 filed on Jan. 20, 2011 including the specification, drawings and abstract, is incorporated herein by reference in its entirety.

BACKGROUND OF THE INVENTION

1. Field of the Invention

The invention relates to a wheel rolling bearing device.

2. Description of Related Art

In a wheel rolling bearing device (also referred to as "wheel hub unit"), an inner-side inner ring raceway surface and an outer-side inner ring raceway surface are formed at a predetermined axial interval on the outer peripheral surface of a hub spindle of a hub wheel to which a wheel is fitted. An inner-side outer ring raceway surface and an outer-side outer ring raceway surface are formed at a predetermined axial interval on the inner peripheral surface of an outer ring member arranged on the outer periphery of the hub spindle. Inner-row balls are rollably arranged between the inner-side inner ring raceway surface of the hub spindle and the inner-side outer ring raceway surface of the outer ring member, and outer-row balls are rollably arranged between the outer-side inner ring raceway surface of the hub spindle and the outer-side outer ring raceway surface of the outer ring member. In the thus configured wheel rolling bearing device, a pitch diameter of the inner-row ball set and a pitch diameter of the outer-row ball set each are increased to increase the number of the inner-row balls and the number of the outer-row balls to thereby make it possible to achieve high stiffness. However, if the pitch diameter of the inner-row ball set and the pitch diameter of the outer-row ball set each are increased, the size of the outer ring member also increases. As a result, the weight of the outer ring member increases. In addition, if the size of the outer ring member increases, the outside diameter of a fitting shaft portion of the outer ring member may be excessively large with respect to an assembling hole of a vehicle body-side member, such as a knuckle and a carrier, of a suspension of a vehicle. As a result, it may be impossible to fit the fitting shaft portion into the assembling hole. For this reason, there is known the following technique. According to the technique, in order to achieve weight reduction and high stiffness while maintaining the outside diameter of the fitting shaft portion of the outer ring member at such a diameter that the fitting shaft portion is able to be fitted into the assembling hole of the vehicle body-side member, the pitch diameter of the outer-row ball set is set to be larger than the pitch diameter of the inner-row ball set. Thus, the number of the outer-row balls is larger than the number of the inner-row balls (for example, see Japanese Patent Application Publication No. 2004-108449 (JP-A-2004-108449)).

If the pitch diameter of the outer-row ball set is set to be larger than the pitch diameter of the inner-row ball set to make the number of the outer-row balls larger than the number of the inner-row balls, weight reduction and stiffness increase are promoted effectively. However, if the pitch diameter of the outer-row ball set is increased, the outer-row balls tend to easily run on the outer-side raceway shoulder when a load during rotation of the bearing is applied to the outer-row balls. When the outer-row balls run on the outer-side raceway shoulder, edge stress occurs at a boundary edge portion between the outer-side outer ring raceway surface and the outer-side raceway shoulder. As a result, the bearing service life may be shortened.

SUMMARY OF THE INVENTION

It is an object of the invention to provide a wheel rolling bearing device with which it is possible to prevent outer-row balls from running on an outer-side raceway shoulder while promoting weight reduction and stiffness increase.

An aspect of the invention relates to a wheel rolling bearing device described as follows. An inner-side inner ring raceway surface and an outer-side inner ring raceway surface are formed at a predetermined interval in an axial direction on an outer peripheral surface of a hub spindle of a hub wheel to which a wheel is connected. An inner-side outer ring raceway surface and an outer-side outer ring raceway surface are formed at a predetermined interval in the axial direction on an inner peripheral surface of an outer ring member arranged on an outer periphery of the hub spindle. Inner-row balls are rollably arranged between the inner-side inner ring raceway surface and the inner-side outer ring raceway surface. Outer-row balls are rollably arranged between the outer-side inner ring raceway surface and the outer-side outer ring raceway surface. Where a pitch diameter of the inner-row ball set is D1 and a pitch diameter of the outer-row ball set is D2, D1 and D2 are set so as to satisfy the relationship "D1<D2". Where an angle of a raceway circular arc from an intersection point of each inner-row ball with the inner-side outer ring raceway surface at a contact angle to a boundary portion of an inner-side raceway shoulder is θ1 and an angle of a raceway circular arc from an intersection point of each outer-row ball with the outer-side outer ring raceway surface at a contact angle to a boundary portion of an outer-side raceway shoulder is θ2, θ1 and θ2 are set so as to satisfy the relationship "θ1<θ2".

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described.

First Embodiment

Figure 1:
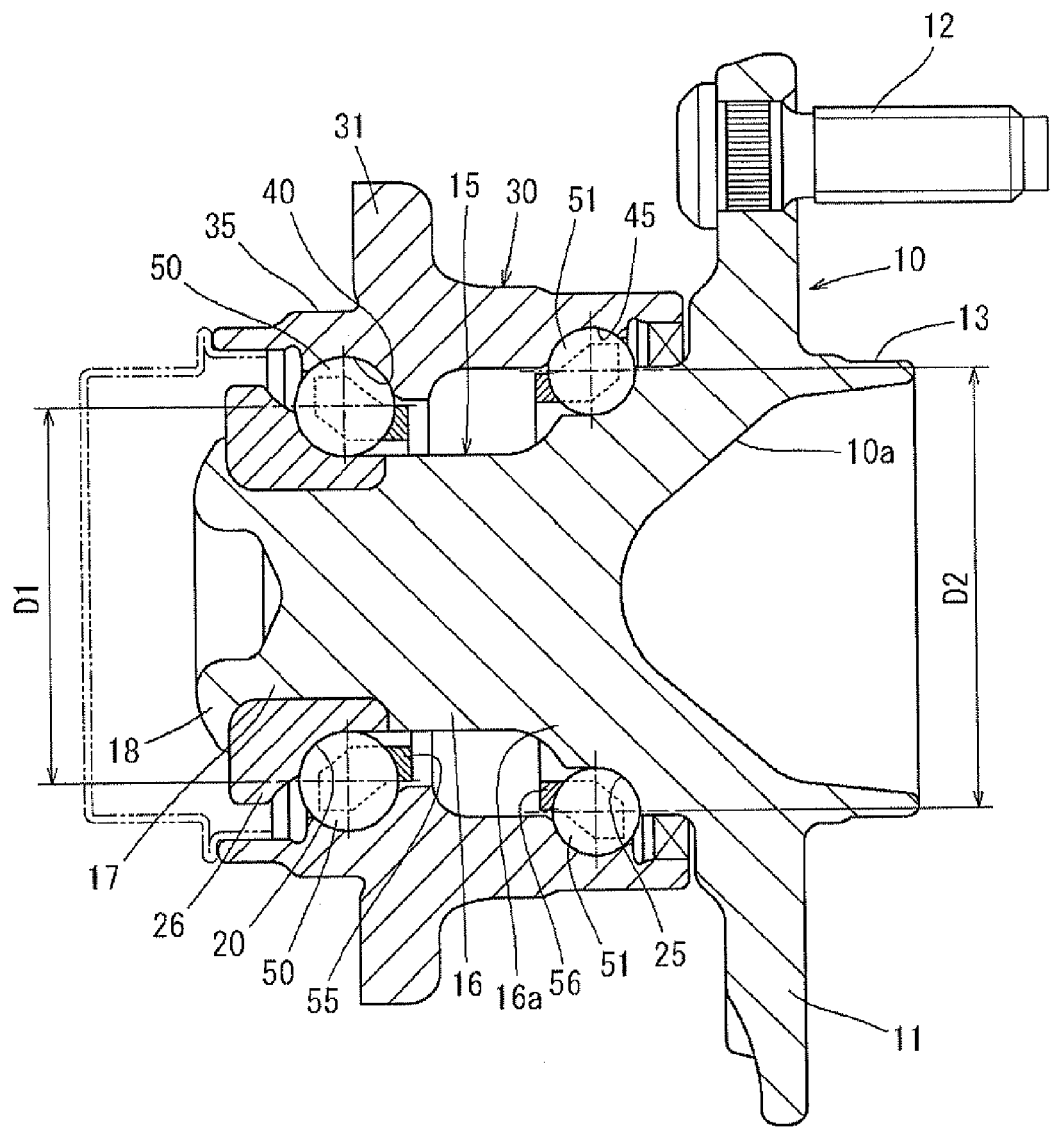
FIG. 1 is a longitudinal sectional view that shows a wheel rolling bearing device according to a first embodiment of the invention.

A first embodiment of the invention will be described with reference to FIG. 1 to FIG. 4. As shown in FIG. 1, a wheel rolling bearing device (wheel hub unit) includes a hub wheel 10, an outer ring member 30, inner-row balls 50 and outer-row balls 51 forming a double row, and inner-side and outer-side cages 55 and 56, and is unitized. The hub wheel 10 integrally has a hub spindle 15 that serves as an inner ring member for constituting a double row angular contact ball bearing.

As shown in FIG. 1, the hub wheel 10 has the hub spindle 15 and a flange body 11 that are integrally formed. The flange body 11 is formed at the vehicle outer-side end portion of the hub spindle 15 formed coaxially with the hub spindle 15. The hub wheel 10 has a wheel fitting portion 13 at the vehicle outer-side surface of the flange body 11. The center hole of a wheel (not shown) is fitted to the wheel fitting portion 13 with a brake rotor interposed therebetween. Multiple hub bolts 12 for fastening the wheel are fixedly press-fitted to the flange body 11 at a predetermined pitch.

As shown in FIG. 1, an inner-side inner ring raceway surface 20 and an outer-side inner ring raceway surface 25 are formed on the outer peripheral surface of the hub spindle 15 at a predetermined interval in the axial direction. In the first embodiment, the hub spindle 15 is formed in a stepped shaft such that a portion next to the flange body 11 is large in diameter and a portion next to the distal end is small in diameter. The outer-side inner ring raceway surface 25 is formed on the outer peripheral surface of a large-diameter shoulder 16a that is formed at one side (next to the flange body 11) of the large-diameter portion 16 of the hub spindle 15. In addition, an inner ring body 26 is fitted around the outer peripheral surface of the small-diameter portion 17 of the hub spindle 15, and the inner-side inner ring raceway surface 20 is formed on the outer peripheral surface of the inner ring body 26. Furthermore, a cylindrical portion extending from the end portion of the small-diameter portion 17 of the hub spindle 15 is clinched radially outward by a clinching tool to form a clinched portion 18. Thus, the inner ring body 26 is held between the step surface of the small-diameter portion 17 of the hub spindle 15 and the clinched portion 18.

Figure 2:
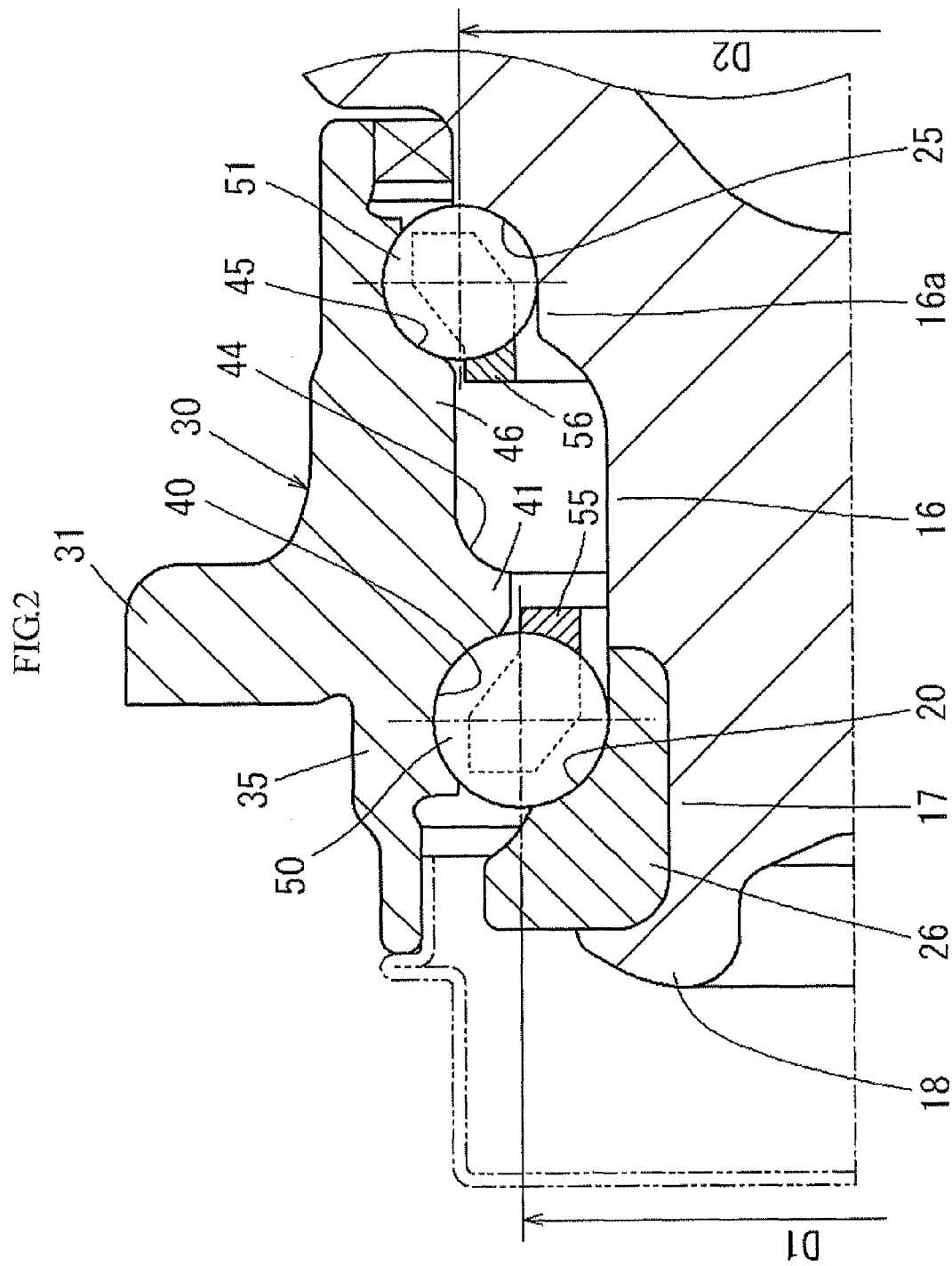
FIG. 2 is an enlarged longitudinal sectional view that shows a state where a hub spindle, an outer ring member, inner-row balls and outer-row balls are assembled together as shown in FIG. 1.

As shown in FIG. 1 and FIG. 2, a fitting shaft portion 35 is formed at one end side (inner side in the vehicle widthwise direction) of the outer ring member 30. The fitting shaft portion 35 is fitted into an assembling hole of a vehicle body-side member, such as a knuckle and a carrier, supported by a suspension (not shown) of a vehicle. A vehicle body-side flange 31 is integrally formed at a portion of the outer peripheral surface of the outer ring member 30, next to the fitting shaft portion 35. The vehicle body-side flange 31 is fastened to the mounting surface of the vehicle body-side member with bolts. An inner-side outer ring raceway surface 40 and an outer-side outer ring raceway surface 45 that respectively correspond to the inner-side inner ring raceway surface 20 and outer-side inner ring raceway surface 25 of the hub spindle 15 are formed on the inner peripheral surface of the outer ring member 30 at a predetermined interval in the axial direction.

Multiple inner-row balls 50 are rollably arranged between the inner-side inner ring raceway surface 20 and the inner-side outer ring raceway surface 40 in a state where the inner-row balls 50 are retained by an inner-side cage 55. Multiple outer-row balls 51 are rollably arranged between the outer-side inner ring raceway surface 25 and the outer-side outer ring raceway surface 45 in a state where the outer-row balls 51 are retained by an outer-side cage 56. A required preload is applied to each of the inner-row balls 50 and the outer-row balls 51 by clinching force generated by the above-described clinched portion 18 of the hub spindle 15.

As shown in FIG. 2, where the pitch diameter of the inner-row ball 50-set is D1 and the pitch diameter of the outer-row ball 51-set is D2, D1 and D2 are set so as to satisfy the relationship "D1<D2". That is, in the first embodiment, in order to achieve weight reduction and high stiffness of the wheel rolling bearing device while maintaining the outside diameter of the fitting shaft portion 35 of the outer ring member 30 at such a diameter that the fitting shaft portion 35 is able to be fitted in the assembling hole of the vehicle body-side member, the pitch diameter D2 of the outer-row ball 51-set is set to be larger than the pitch diameter D1 of the inner-row ball 50-set. Then, the diameter of each of the outer-row balls 51 is set to be smaller than the diameter of each of the inner-row balls 50. Thus, the number of the outer-row balls 51 is larger than the number of the inner-row balls 50.

On the basis of the relationship "D1<D2", in order to arrange the outer-row balls 51 at the pitch diameter D2, the outer-side inner ring raceway surface 25 formed on the outer peripheral surface of the hub spindle 15 of the hub wheel 10 is formed so as to be larger in diameter than the inner-side inner ring raceway surface 20. As shown in FIG. 1, a recess 10a is formed from the center hole portion of the wheel fitting portion 13 of the hub wheel 10 toward the inner side so as to be large and deep as much as possible with a desired thickness left between the outer-side inner ring raceway surface 25 and the recess 10a. Thus, weight reduction of the hub wheel 10 and, consequently, weight reduction of the wheel rolling bearing device, is achieved.

On the basis of the relationship "D1<D2", in order to arrange the outer-row balls 51 at the pitch diameter D2, the outer-side outer ring raceway surface 45 formed on the inner-peripheral surface of the outer ring member 30 is formed so as to be larger in diameter than the inner-side outer ring raceway surface 40. As shown in FIG. 2, an inner-side raceway shoulder 41 and an outer-side raceway shoulder 46 are formed on the inner peripheral surface of the outer ring member 30. The inner-side raceway shoulder 41 is contiguous with the edge of the inner-side outer ring raceway surface 40 at a portion located between the inner-side outer ring raceway surface 40 and the outer-side outer ring raceway surface 45. The outer-side raceway shoulder 46 is contiguous with the edge of the outer-side outer ring raceway surface 45. The inner-side raceway shoulder 41 is formed in a cylindrical shape that is parallel to the axial direction. The outer-side raceway shoulder 46 is formed in a cylindrical shape that is larger in diameter than the inner-side raceway shoulder 41 and that is parallel to the axial direction. A boundary rounded surface 44 is formed between the outer-side raceway shoulder 46 and the inner-side raceway shoulder 41.

Figure 3:
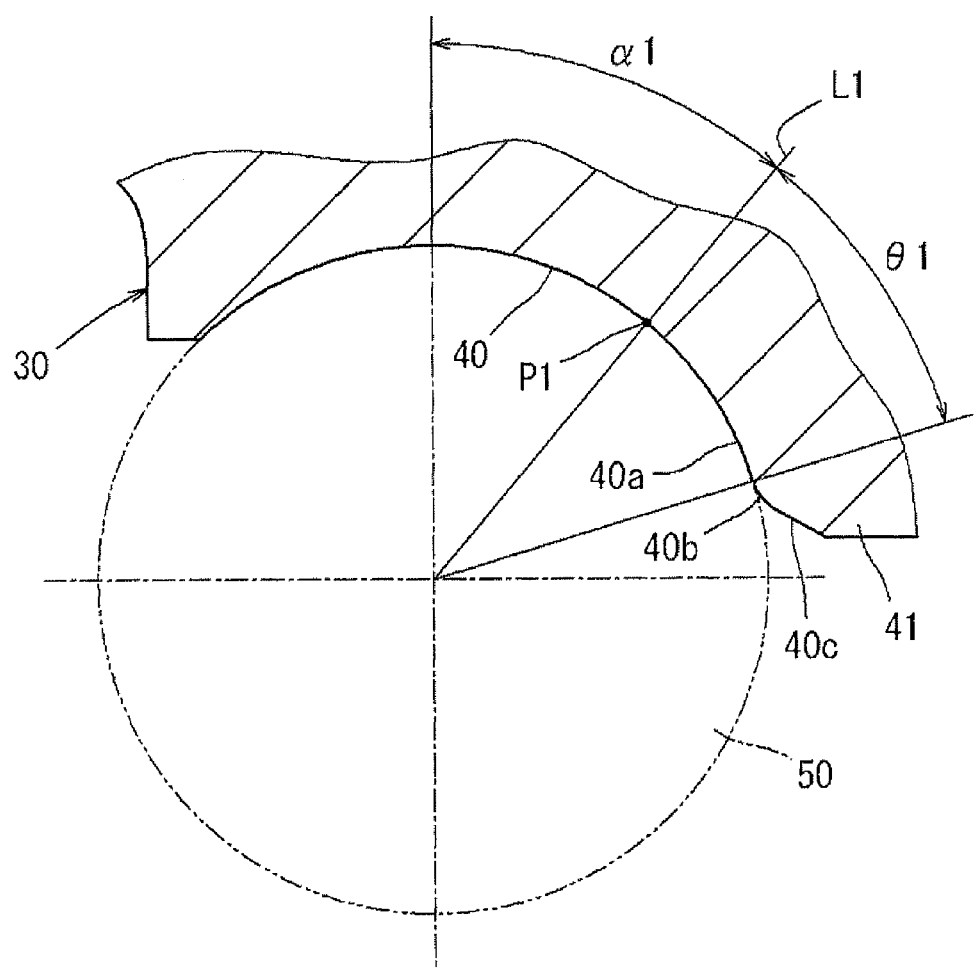
FIG. 3 is an enlarged longitudinal sectional view that shows an inner-side outer ring raceway surface and an inner-side raceway shoulder of the outer ring member shown in FIG. 2.
Figure 4:
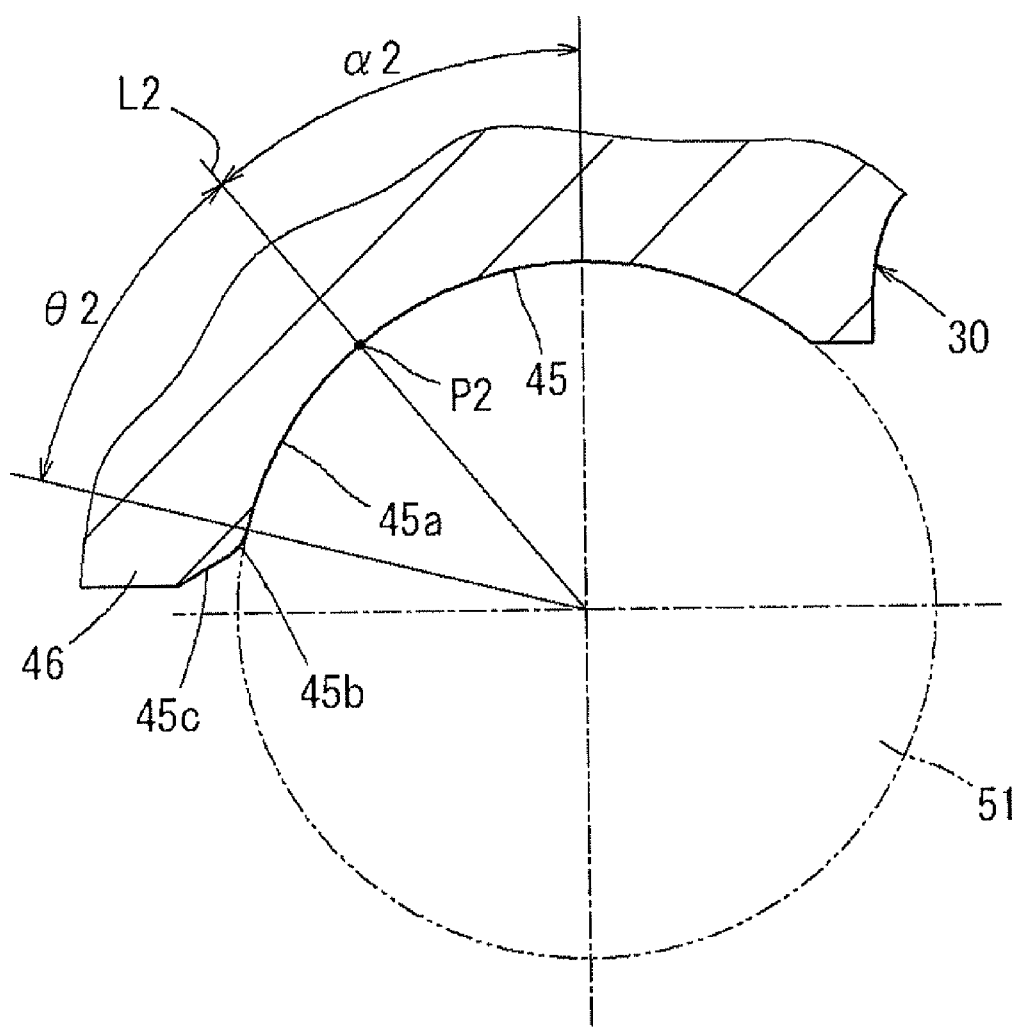
FIG. 4 is an enlarged longitudinal sectional view that shows an outer-side outer ring raceway surface and an outer-side raceway shoulder of the outer ring member shown in FIG. 2.

As shown in FIG. 3, the angle of a raceway circular arc 40*a* from the intersection point P1 of each inner-row ball 50 with the inner-side outer ring raceway surface 40 at a contact angle α1 (the intersection point of the line of action L1, forming the contact angle α1, with the inner-side outer ring raceway surface 40) to the inner-side raceway shoulder 41 is termed θ1. As shown in FIG. 4, the angle of a raceway circular arc 45*a* from the intersection point P2 of each outer-row ball 51 with the outer-side outer ring raceway surface 45 at a contact angle α2 (the intersection point of the line of action L2, forming the contact angle α2, with the outer-side outer ring raceway surface 45) to the outer-side raceway shoulder 46 is termed θ2. θ1 and θ2 are set so as to satisfy the relationship "θ1<θ2". In other words, a ground range (angle) of the outer-side outer ring raceway surface 45 is set to be larger than a ground range (angle) of the inner-side outer ring raceway surface 40. Note that the contact angle α1 is an angle formed by a plane perpendicular to the rotation axis of the bearing and the line of action L1 of resultant of forces transmitted to each inner-row ball 50 by the inner ring body 26 and the outer ring member 30. In addition, the contact angle α2 is an angle formed by a plane perpendicular to the rotation axis of the bearing and the line of action L2 of resultant force transmitted to each outer-row ball 51 by the hub spindle 15 (inner ring member) and the outer ring member 30.

In the first embodiment, as shown in FIG. 3, a circular arc surface 40*b* and an inclined surface 40*c* are contiguously formed at the boundary portion between the edge of the inner-side outer ring raceway surface (raceway circular arc 40*a*) 40 and the edge of the inner-side raceway shoulder 41. As shown in FIG. 4, a circular arc surface 45*b* and an inclined surface 45*c* are contiguously formed at the boundary portion between the edge of the outer-side outer ring raceway surface (raceway circular arc 45*a*) 45 and the edge of the outer-side raceway shoulder 46.

The wheel rolling bearing device according to the first embodiment is configured as described above. Thus, when the pitch diameter D2 of the outer-row ball 51-set of the wheel rolling bearing device is set to be larger than the pitch diameter D1 of the inner-row ball 50-set of the wheel rolling bearing device, it is possible to favorably achieve weight reduction and high stiffness of the wheel rolling bearing device. In addition, when the angle θ2 of the raceway circular arc 45*a* of the outer-side outer ring raceway surface 45 is set to be larger than the angle θ1 of the raceway circular arc 40*a* of the inner-side outer ring raceway surface 40, it is possible to favorably prevent the outer-row balls 51 from running on the outer-side raceway shoulder 46, and it is possible to achieve improvement in durability by suppressing a decrease in bearing service life.

Figure 5:
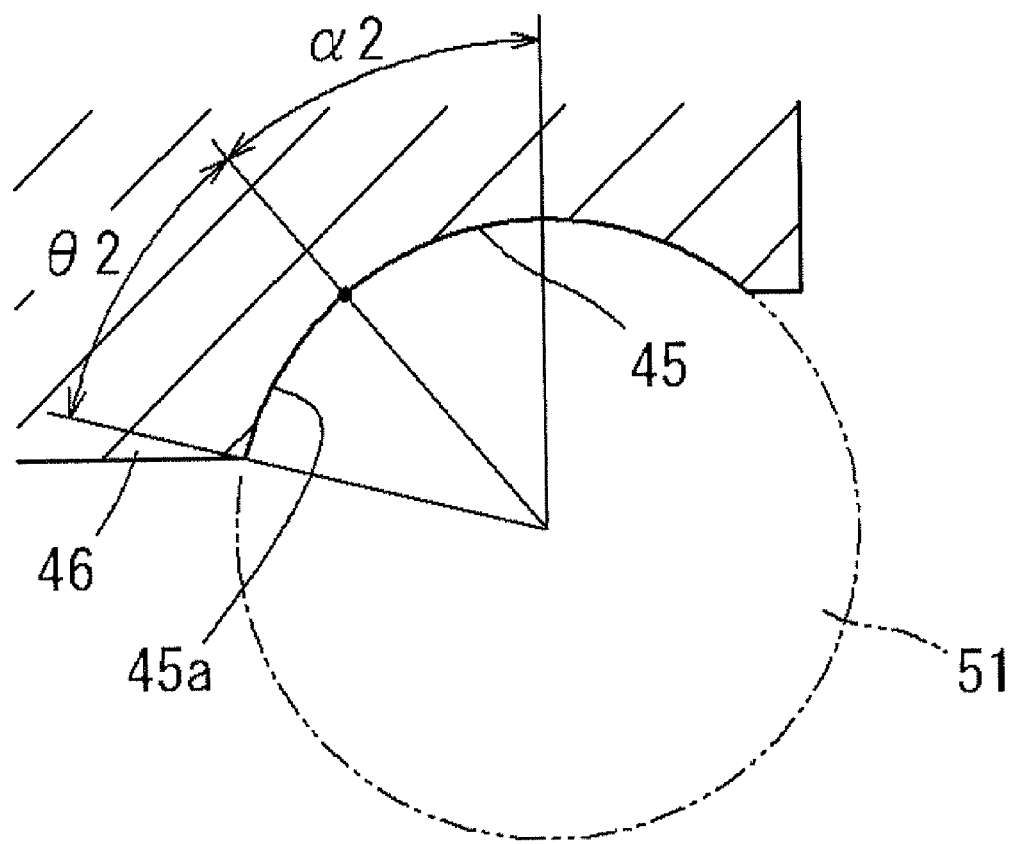
FIG. 5 is a view that illustrates an embodiment in which a boundary portion between the edge of the outer-side outer ring raceway surface and the edge of the outer-side raceway shoulder shown in FIG. 4 is connected without chamfering.
Figure 6:
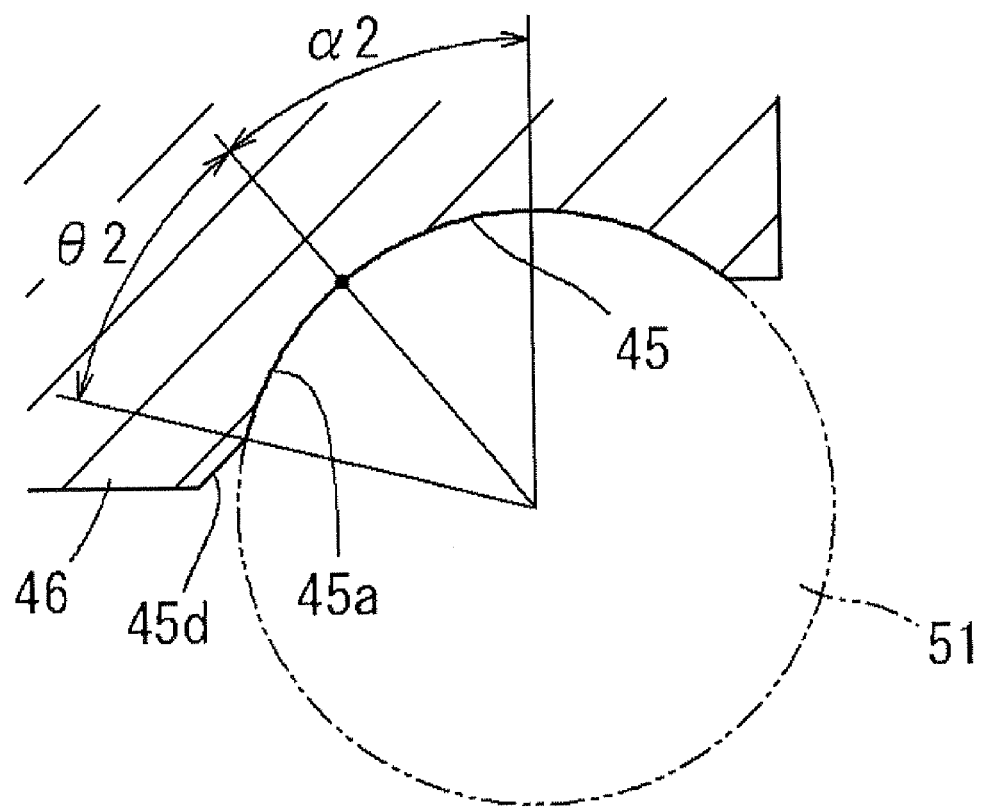
FIG. 6 is a view that illustrates an embodiment in which the boundary portion between the edge of the outer-side outer ring raceway surface and the edge of the outer-side raceway shoulder shown in FIG. 4 is C-chamfered.
Figure 7:
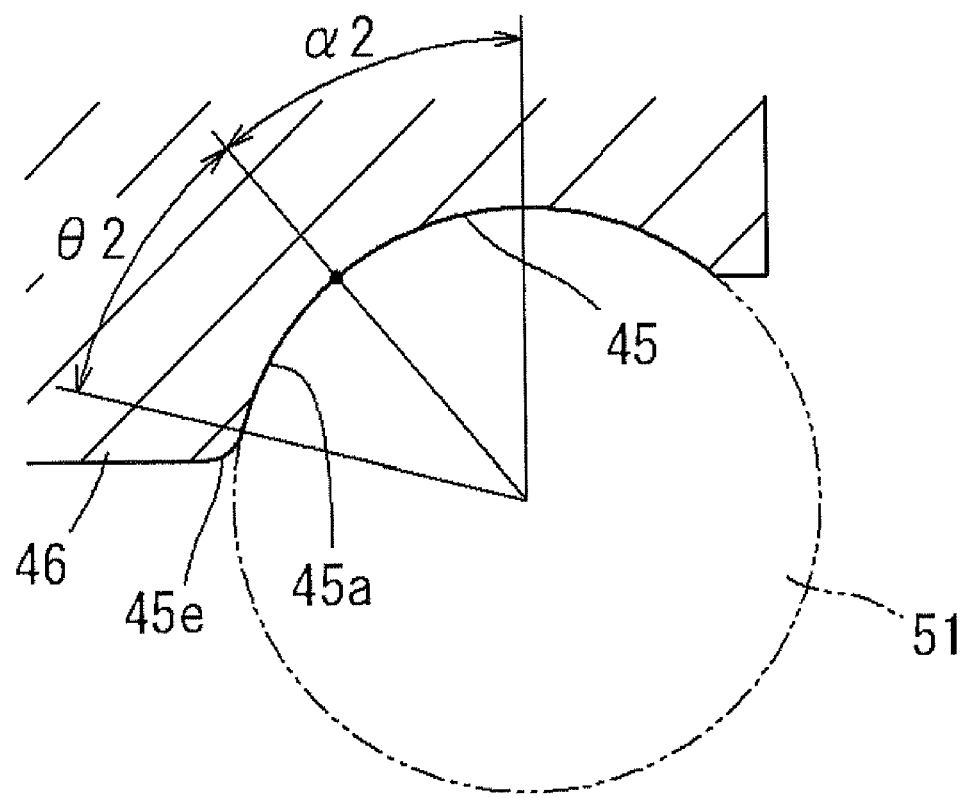
FIG. 7 is a view that illustrates an embodiment in which the boundary portion between the edge of the outer-side outer ring raceway surface and the edge of the outer-side raceway shoulder shown in FIG. 4 is round-chamfered.

In the first embodiment, the case where the circular arc surface 45*b* and the inclined surface 45*c* are contiguously formed at the boundary portion between the edge of the outer-side outer ring raceway surface (raceway circular arc 45*a*) 45 and the edge of the outer-side raceway shoulder 46 is illustrated. However, the invention may also be implemented in, for example, a case as shown in FIG. 5 where the boundary portion between the edge of the outer-side outer ring raceway surface (raceway circular arc 45*a*) 45 and the edge of the outer-side raceway shoulder 46 is connected without chamfering. The invention may also be implemented in a case as shown in FIG. 6 where a chamfered surface 45*d* subjected to C-chamfering is formed at the boundary portion between the edge of the outer-side outer ring raceway surface (raceway circular arc 45*a*) 45 and the edge of the outer-side raceway shoulder 46. In addition, the invention may also be implemented in a case as shown in FIG. 7 where a chamfered surface 45*e* subjected to round-chamfering is formed at the boundary portion between the edge of the outer-side outer ring raceway surface (raceway circular arc 45*a*) 45 and the edge of the outer-side raceway shoulder 46.

Figure 8:
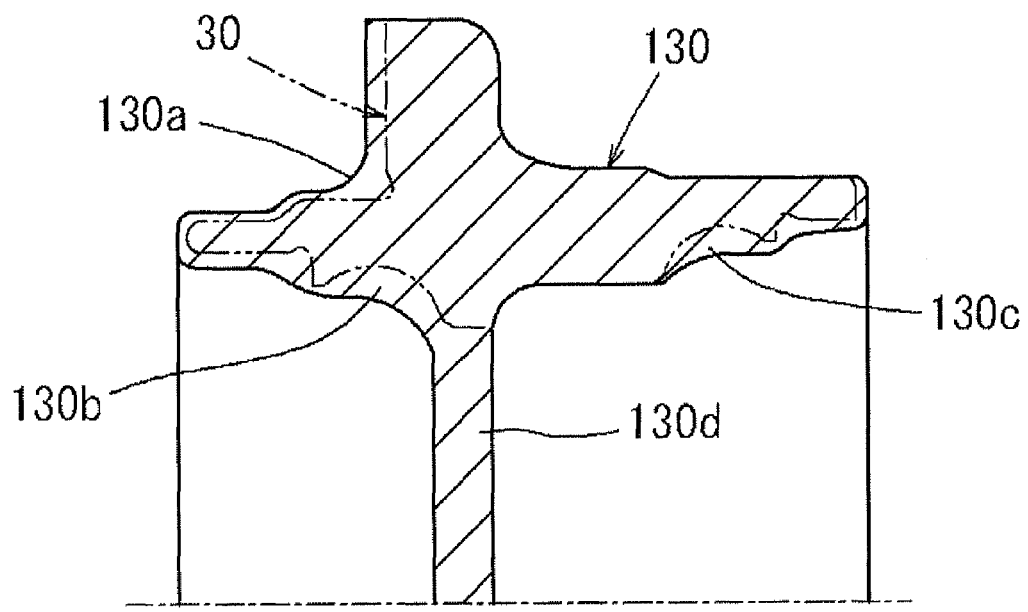
FIG. 8 is a longitudinal sectional view that shows a forging for forming the outer ring member shown in FIG. 1.

Next, the case where the outer ring member 30 is formed from a hot forging will be described with reference to FIG. 8 to FIG. 10. As shown in FIG. 8, a forging 130 corresponding to the outer ring member 30 will be formed by hot forging. At the outer peripheral side of the forging 130, a turning allowance 130*a* is formed at portions corresponding to the assembling surface side of the vehicle body-side flange 31 of the outer ring member 30 and the outer peripheral surface side of the fitting shaft portion 35 of the outer ring member 30. At the inner peripheral side of the forging 130, turning allowances 130*b* and 130*c* are respectively formed at portions corresponding to the inner hole of the fitting shaft portion 35, the inner-side outer ring raceway surface 40, the inner-side raceway shoulder 41, the outer-side outer ring raceway surface 45 and the outer-side inner hole of the outer ring member 30, and an intermediate wall 130*d* is formed at a portion corresponding to the inner peripheral side of the inner-side raceway shoulder 41. No turning allowance is formed at portions corresponding to the outer-side raceway shoulder 46 and boundary rounded surface 44 of the outer ring member 30, but those portions remain as forged skins. The outer-side surface of the intermediate wall 130*d* is located at the edge, next to the boundary rounded surface 44, of the inner-side raceway shoulder 41 of the outer ring member 30. The distance (that is, thickness) between the outer-side surface and inner-side surface of the intermediate wall 130*d* is set to be larger than the axial length of the inner-side raceway shoulder 41 of the outer ring member 30. For example, when the axial length of the inner-side raceway shoulder 41 of the outer ring member 30 is set to about 3 mm or above, the thickness of the intermediate wall is set to about 5 mm or above.

Figure 9:
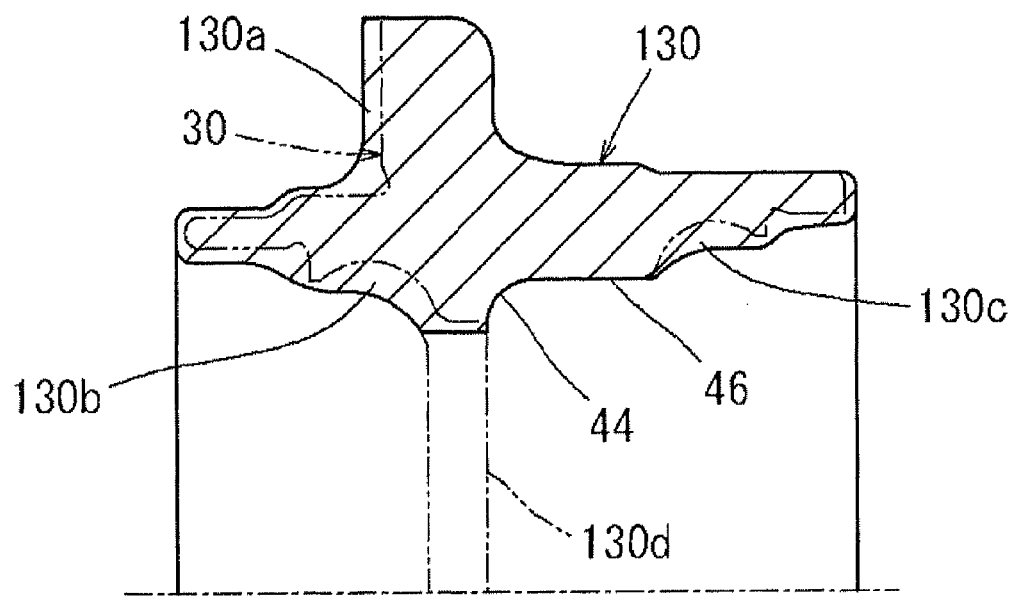
FIG. 9 is a longitudinal sectional view that shows a state where an intermediate wall formed inside the forging shown in FIG. 8 is punched by a punch.
Figure 10:
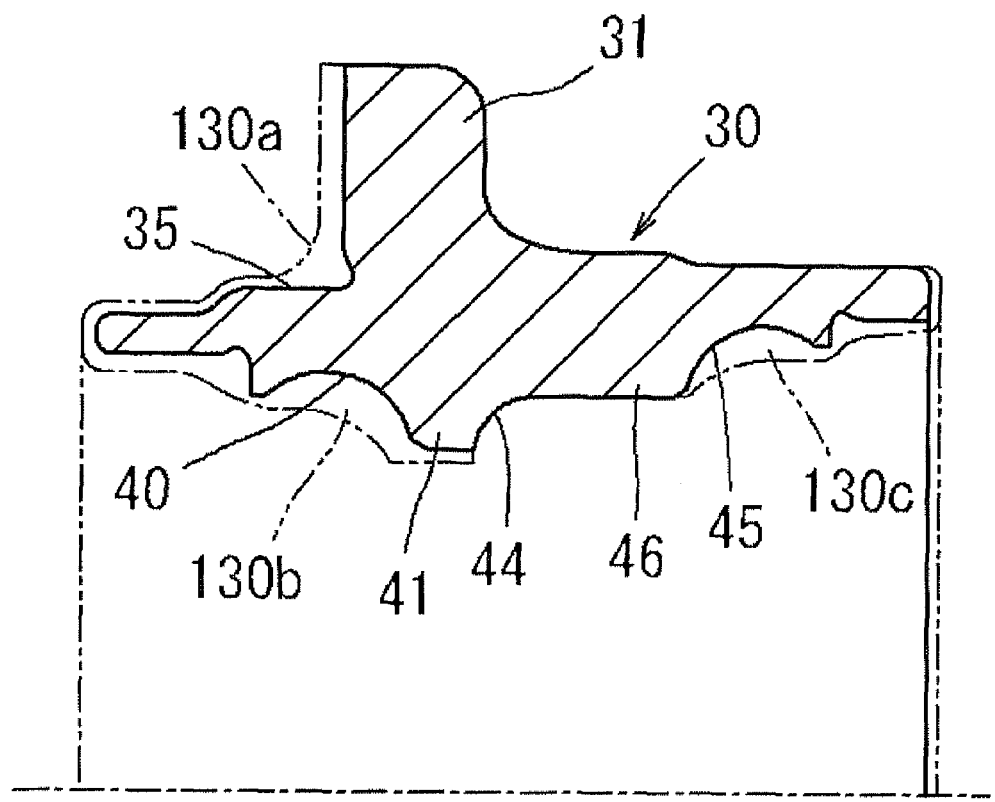
FIG. 10 is a longitudinal sectional view that shows a state where the forging shown in FIG. 9 is turned and ground into the outer ring member.

The above described intermediate wall 130*d* of the forging 130 is punched by perforating with a punch, or the like, as shown in FIG. 9. At this time, the diameter of the punched hole is slightly smaller than the inside diameter of the inner-side raceway shoulder 41 of the outer ring member 30. After that, the surface of the forged skin of each of the boundary rounded surface 44 and the outer-side raceway shoulder 46 is subjected to shot blasting. Thus, the surface of the forged skin of each of the outer-side raceway shoulder 46 and the boundary rounded surface 44 has a shot-blasted surface subjected to shot blasting. After that, as shown in FIG. 10, the turning allowances 130*a*, 130*b* and 130*c* of portions of the forging 130 are removed by turning, portions that need to be ground, such as the inner-side outer ring raceway surface 40 and the outer-side outer ring raceway surface 45, are ground to thereby manufacture the outer ring member 30.

As described above, the surfaces of the outer-side raceway shoulder 46 and boundary rounded surface 44 of the outer ring member 30 each have a shot-blasted surface that is obtained by subjecting the surface of the forged skin to shot blasting. Therefore, those surfaces do not need to be subjected to turning. Therefore, it is possible to reduce the weight of a forged material by the amount by which the surface of the outer-side raceway shoulder 46 and the surface of the boundary rounded surface 44 are turned, and shot blasting may be carried out in a shorter period of time than that of turning. Therefore, cost reduction is efficiently promoted.

Note that the aspect of the invention is not limited to the first embodiment, and the invention may be implemented in various other embodiment without departing from the scope of the invention.

What is claimed is:

1. A wheel rolling bearing device in which an inner-side inner ring raceway surface and an outer-side inner ring raceway surface are formed at a predetermined interval in an axial direction on an outer peripheral surface of a hub spindle of a hub wheel to which a wheel is connected, an inner-side outer ring raceway surface and an outer-side outer ring raceway surface are formed at a predetermined interval in the axial direction on an inner peripheral surface of an outer ring member arranged on an outer periphery of the hub spindle, inner-row balls are rollably arranged between the inner-side inner ring raceway surface and the inner-side outer ring raceway surface, outer-row balls are rollably arranged between the outer-side inner ring raceway surface and the outer-side outer ring raceway surface, wherein:
 a pitch diameter of the inner-row balls is less than a pitch diameter of the outer-row balls;
 an angle of a raceway circular arc measured from a contact point of each inner-row ball with the inner-side outer ring raceway surface to an outer-side edge of the inner-side outer ring raceway surface is less than an angle of a raceway circular arc measured from a contact point of each outer-row ball with the outer-side outer ring raceway surface to an inner-side edge of the outer-side outer ring raceway surface, and
 the contact point of each inner-row ball with the inner-side outer ring raceway surface diametrically opposes the contact point of each outer-row ball with the outer-side outer ring raceway surface.

2. The wheel rolling bearing device according to claim 1, wherein
 the outer ring member is formed by forging, and
 a surface of a boundary rounded surface between an outer-side raceway shoulder and an inner-side raceway shoulder and a surface of the outer-side raceway shoulder each have a shot-blasted surface.

3. A wheel rolling bearing device comprising:
 a hub wheel including a hub spindle;
 an outer ring member arranged on an outer periphery of the hub spindle;
 an inner-side inner ring raceway surface on an outer peripheral surface of the hub spindle;
 an outer-side inner ring raceway surface on the outer peripheral surface of the hub spindle, the inner-side inner ring raceway surface and the outer-side inner ring raceway surface being formed at a predetermined interval in an axial direction of the outer peripheral surface of the hub spindle;
 an inner-side outer ring raceway surface on an inner peripheral surface of the outer ring member;
 an outer-side outer ring raceway surface on the inner peripheral surface of the outer ring member, the inner-side outer ring raceway surface and the outer-side outer ring raceway surface being formed at a predetermined interval in the axial direction of the inner peripheral surface of the outer ring member;
 inner-row balls rollably arranged between the inner-side inner ring raceway surface and the inner-side outer ring raceway surface; and
 outer-row balls rollably arranged between the outer-side inner ring raceway surface and the outer-side outer ring raceway surface, wherein:
 a pitch diameter of the inner-row balls is less than a pitch diameter of the outer-row balls,
 an angle of a raceway circular arc measured from a contact point of each inner-row ball with the inner-side outer ring raceway surface to an outer-side edge of the inner-side outer ring raceway surface is less than an angle of a raceway circular arc measured from a contact point of each outer-row ball with the outer-side outer ring raceway to an inner-side edge of the outer-side outer ring raceway surface, and
 the contact point of each inner-row ball with the inner-side outer ring raceway surface is diametrically opposed to the contact point of each outer-row ball with the outer-side outer ring raceway surface.

4. The wheel rolling bearing device according to claim 3, further comprising:
 an outer-side outer ring raceway shoulder;
 an inner-side outer ring raceway shoulder; and
 a boundary rounded surface arranged between the outer-side outer ring raceway shoulder and the inner-side outer ring raceway shoulder, wherein:
 the boundary rounded surface and a surface of the outer-side outer ring raceway shoulder each have a shot-blasted surface; and
 the outer ring member is formed by forging.

5. The wheel rolling bearing device according to claim 3, wherein the outer-side inner ring raceway surface has a diameter larger than a diameter of the inner-side inner ring raceway surface.

6. The wheel rolling bearing device according to claim 3, wherein the outer-side outer ring raceway surface has a diameter larger than a diameter of the inner-side outer ring raceway surface.

* * * * *